July 3, 1951 O. A. LANGOS Re. 23,386

SELF-FEEDING PAPER BURSTING TOY GUN

Original Filed Jan. 7, 1948 2 Sheets-Sheet 1

INVENTOR.
Otto A. Langos
BY
Foorman L. Mueller
Atty.

SELF-FEEDING PAPER BURSTING TOY GUN

Original Filed Jan. 7, 1948 2 Sheets-Sheet 2

INVENTOR.
Otto A. Langos
BY
Foorman L. Mueller
Atty.

Reissued July 3, 1951

Re. 23,386

UNITED STATES PATENT OFFICE 23,386

SELF-FEEDING PAPER BURSTING TOY GUN

Otto A. Langos, Chicago, Ill.

Original No. 2,490,991, dated December 13, 1949, Serial No. 853, January 7, 1948. Application for reissue February 27, 1950, Serial No. 146,443

17 Claims. (Cl. 46—195)

Matter enclosed in heavy brackets [ ] appears in the original patent but forms no part of this reissue specification; matter printed in italics indicates the additions made by reissue.

This invention relates to toy guns of the paper bursting type.

In prior paper bursting guns difficulty has been encountered in obtaining a satisfactory paper feed. Sometimes the paper is not advanced sufficiently between successive pulls of the trigger to present an unbroken area of paper at the muzzle of the gun, so that several pulls of the trigger may be required to produce a single report. Furthermore, the paper feeding devices for mechanisms of this type have tended heretofore to be cumbersome, expensive and unattractive in appearance.

An object of this invention is to provide a paper bursting pistol or other gun having an improved paper feeding arrangement whereby the disadvantages mentioned above are obviated.

A further object is to provide an improved paper handling mechanism which is disposed entirely within the housing of the gun.

A still further object is to effect a positive paper feed with novel, simple and economical means.

The novel features of this invention include a smooth paper guideway which is an integral part of the gun housing disposed in proximity to a resilient paper feeding pawl arranged on the link extending between the trigger and the piston rod of the gun. The expended portion of the paper strip is led back from the muzzle of the gun through the paper guideway, which extends approximately parallel to the piston rod. As the trigger is squeezed, the feed pawl bears on the paper and slides along the guideway to advance the paper and present an unbroken area thereof at the gun muzzle, such advancing movement of the paper occurring before the piston rod is released to compress the air in back of the paper.

As another feature, I so arrange the working parts that the paper feed pawl is maintained out of contact with the paper on the return stroke of the trigger, this being effected by novel coaction between the piston rod and the aforesaid link on which the pawl is mounted.

For a better understanding of the invention, together with other objects and features thereof, reference is had to the following detailed description taken in conjunction with the accompanying drawings, in which.

The toy pistol herein disclosed is, in its basic construction, similar to the paper bursting gun disclosed and claimed in United States Letters Patent No. 2,083,535 issued to Otto A. Langos. The gun has a metal body or housing with an air cylinder disposed at the muzzle of the gun, a piston working in said cylinder, and a piston rod supported for sliding movement by the housing. A trigger is connected by a link to the piston rod for retracting the piston against the action of a powerful spring when the trigger is squeezed. [As the trigger nears the end of its] *At the completion of the trigger* working stroke, the link is disengaged from the piston rod, allowing the spring to restore the piston. Meanwhile, an unbroken area of the paper is clamped against the gun muzzle to form an airtight seal, and the compression of air by the piston serves to rupture the paper with a loud report resembling a gunshot.

In accordance with the invention, a paper guideway integral with the gun housing extends lengthwise of the gun above the piston rod, and the expended portion of the paper strip is led rearwardly through this guideway. A resilient pawl mounted on the trigger linkage is arranged to bear against the paper while being moved slidably along the guideway as the trigger is squeezed. When the piston rod is fully retracted, the link is automatically disengaged from the piston rod by being cammed out of a recess in the rod wherein it normally seats. The piston rod then shoots forwardly to burst the paper. During the return stroke of the trigger the link and the piston rod coact to maintain the paper feeding pawl spaced from the paper guideway until the trigger is fully restored, whereupon the link again seats in said recess and the pawl again bears on the paper.

Figure 2:
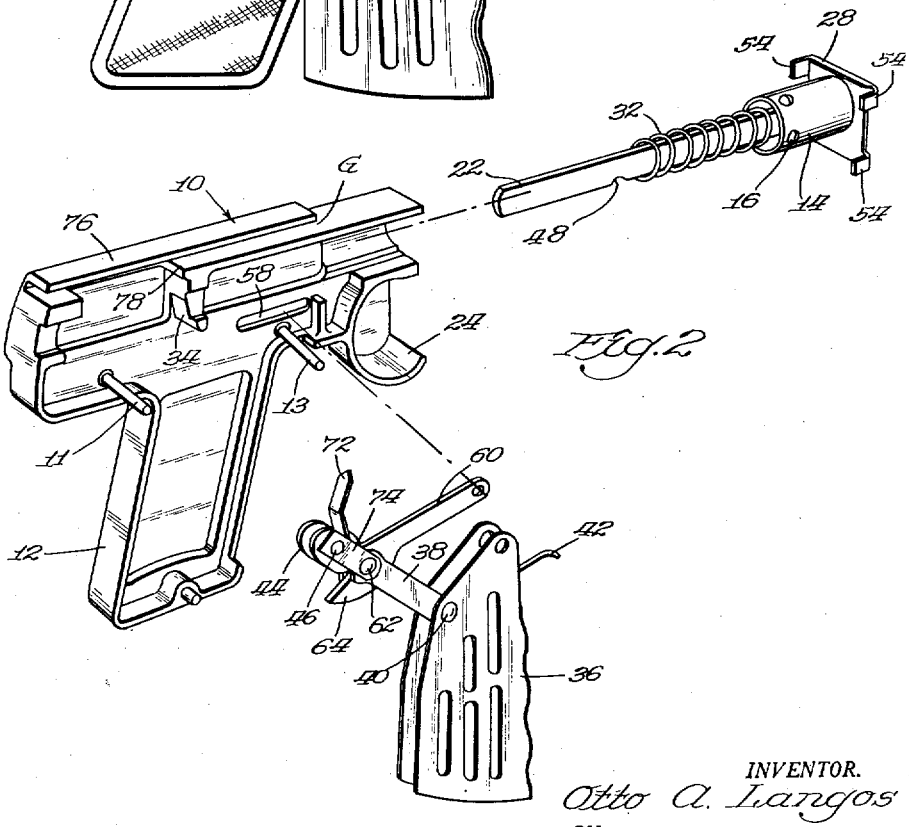
Fig. 2 is a perspective view showing pertinent elements of the gun structure in disassembled relation.

Referring now to the drawings, the gun has a two-part frame or body which includes a housing 10 provided with a grip 12 extending downwardly therefrom. Fastening devices such as rivets 11 and 13 are employed to secure the two halves of the housing together. Within the housing 10 near the muzzle end thereof is disposed a cylinder 14 which is provided with apertures as 16, Figs. 2 and 3, to receive integral lugs as 18 provided on the two parts of the housing 10, whereby the cylinder 14 is retained firmly when these two parts are secured together. A piston 20 connected to a piston rod 22 works within the cylinder 14. The rod 22 is slidingly supported by the frame of the gun, as indicated in the drawings.

The housing 10 includes a paper magazine or supply chamber 24 integral therewith and positioned beneath the cylinder 14 for supporting a roll R of paper. The paper P is led from the roll R up past the muzzle of the gun and rearwardly therefrom through a paper guideway G, which preferably is an integral part of the housing 10. After passing through the guideway G, the paper P projects from the butt end of the housing 10, where it may be torn off and removed from time to time.

Figure 3:
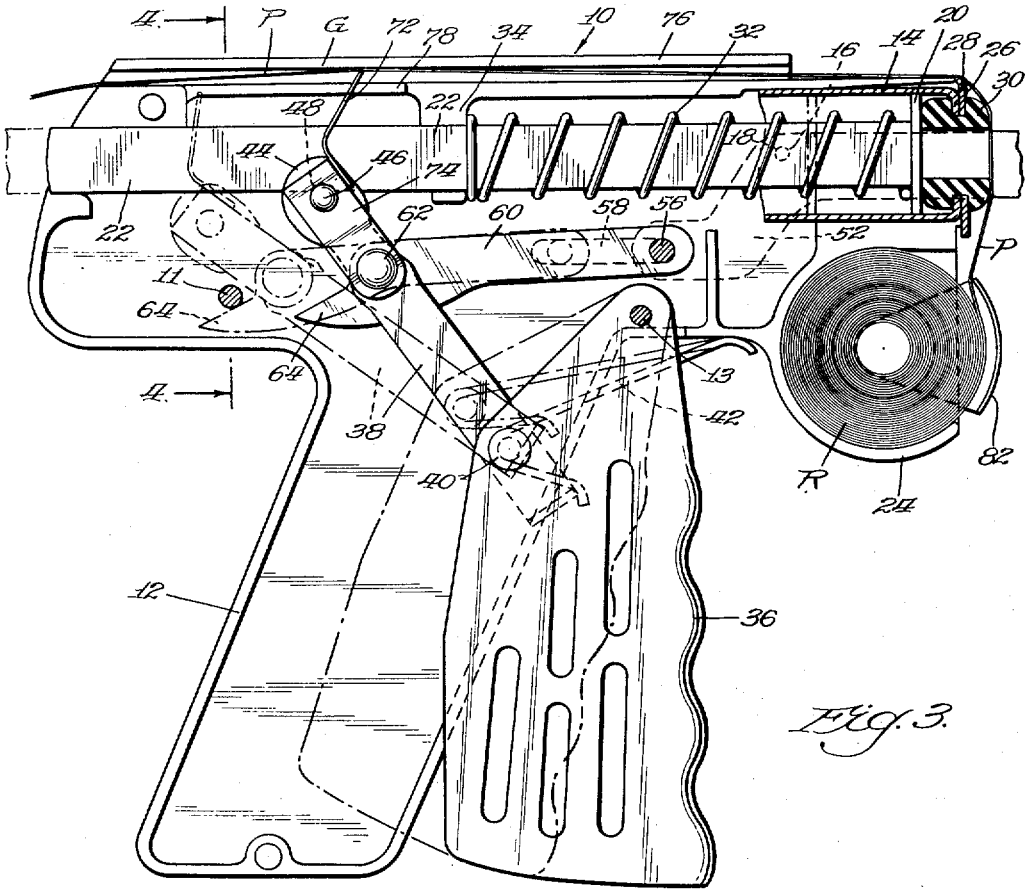
Fig. 3 is a longitudinal section through the gun to illustrate the operative relations of various parts.

The front end of the cylinder 14 is flanged, as indicated at 26, Fig. 3, and a muzzle plate 28 fits tightly against this flange 26. The plate 28 has an opening therein to receive a rubber grommet 30 which serves to secure the plate 28 to the flange 26. The paper P is disposed across the opening in the grommet 30 and, at the appropriate time in the operation of the gun, effects an airtight seal, as will be described presently.

Figure 4:
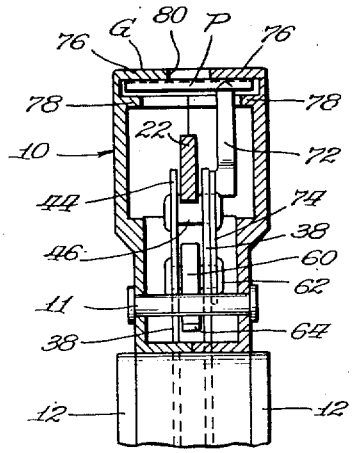
Fig. 4 is a transverse section taken on the line 4—4 in Fig. 3.

A powerful coil spring 32, disposed on the piston rod 22 intermediate the piston 20 and a frame lug 34 through which the rod 22 extends, is employed to effect the compression stroke of the piston 20. For retracting the piston rod against the action of the spring 32 there is provided a trigger 36 which is pivotally mounted on the rivet 13 that holds the two frame pieces together. A double link 38 (Figs. 3 and 4) pivotally connected at 40 to the trigger 36 is subject to the action of a spring 42 which extends around the pivot 40 and bears against an end of the link 38, the other end of the spring 42 bearing against a part of the housing as shown. The spring 42 urges the upper end of the link 38 toward the piston rod 22. A bifurcation or yoke 44 at the upper end of the link 38 partially embraces the rod 22, and a pin or rivet 46 in this yoke normally is received in a notch or recess 48 provided in the lower edge of the piston rod 22. As the trigger 36 is cocked, that is, pulled rearwardly from its full-line position (Fig. 3) into the position thereof indicated by broken lines, the link 38 is pushed from its full-line position to its broken-line position and the pin 46 is effective to move the piston rod 22 rearwardly against the action of spring 32.

Figure 1:
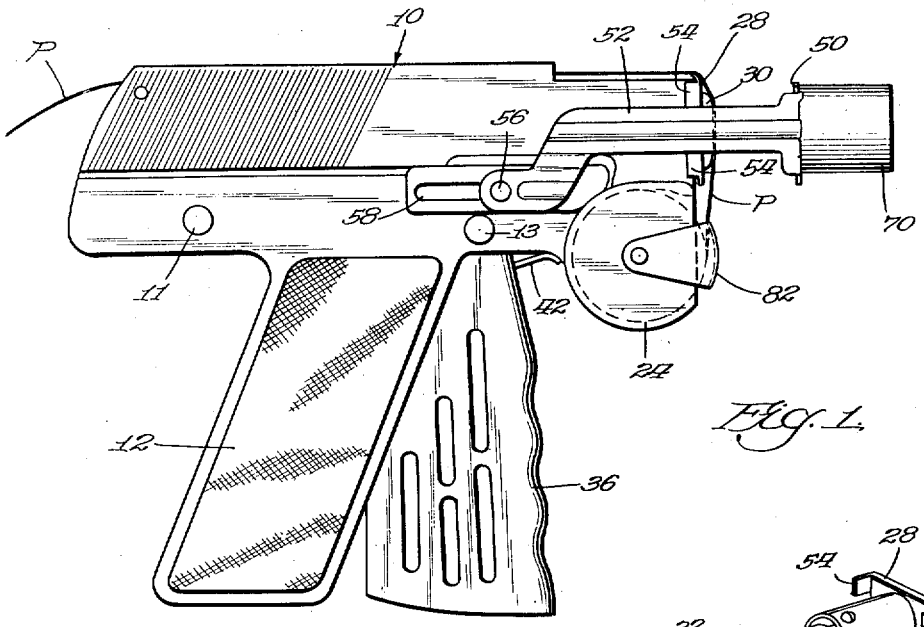
Fig. 1 is an elevational view of a gun constructed in accordance with and embodying the principles of the invention.

For sealing the paper P against the mouth of the grommet 30 there is provided a clamping ring 50, Fig. 1, supported in front of the gun muzzle by a pair of rearwardly extending arms 52. These arms 52 extend between guide lugs 54 on the muzzle plate 28 and curve downwardly at their rear ends, where they are interconnected by a crosspin 56 which passes through slots 58 in opposite sides of the gun housing 10. The link 60 is pivotally connected at its respective ends to the pin 56 and to a rivet 62 on the link 38. The rear end of the link 60 is formed into a cam 64 for a purpose which will be explained.

As the trigger 36 is cocked or pulled to effect retraction of the piston 20 as described above, the link 60 pulls the arms 52 rearwardly to bring the clamping ring 50 against the paper P and produce an airtight seal at the mouth of the grommet 30. This sealing action does not occur until the piston rod 22 nears the end of its rearward stroke, so that the admission of air to the cylinder 14 meanwhile is not impeded. Normally, there is sufficient slack in the paper P for this purpose. As the links 38 and 60 of the trigger mechanism near the end of their rearward travel, the cam 64 engages the rivet 11, causing the link 38 to pivot downwardly about its pivot point 40. Crosspin 46 thereupon is cammed out of the recess 48, releasing the piston rod 22 to the action of the spring 32, which by now is fully compressed. The trigger 36 is held rearwardly in the grip of the user while the piston rod 22 and piston 20 are thrust suddenly ahead by the expansive force of the spring 32. At this time, as has been explained, the paper P is clamped tightly against the grommet 30 of the clamping ring 50. Compression of the air in the cylinder 14 occurs until the paper is ruptured due to the high pressure, causing it to burst with a loud noise. A tube 70 attached to and extending forwardly of the clamping ring 50 functions as a sound amplifier to intensify the noise produced by the bursting paper. When the trigger 36 is released by the user, it is restored by the spring 42, and the various moving parts assume the positions thereof indicated in full lines, Fig. 3.

For feeding the paper P through the guideway G, there is provided a resilient pawl 72 which preferably is formed as an integral, projecting part of a short strip 74 that is secured to the link 38 by the rivets 46 and 62. As shown more clearly in Fig. 4, paper guide channels are defined by wall portions of the gun housing including overhanging flanges or ribs 76 and 78 disposed on both halves of the gun housing 10 parallel with the rod 22. The flanges 76 and 78 preferably are formed integrally with the two parts of the gun housing, the flanges 76 extending along the upper edge of the housing and the flanges 78 being positioned therebelow to support the paper P. A longitudinally extending aperture 80 defined between the inner edges of the two flanges 76 permits the expended portion of the paper strip to be viewed in the guideway G. Normally, when the crosspin 46 is seated in the recess 48, Fig. 3, the feed pawl 72 extends past a narrow section of a rib 78 and bears against the paper strip P to press the paper against the underside of one of the flanges 76, Fig. 4.

The surface of the flange 76 with which the pawl 72 cooperates is relatively smooth. As the trigger 36 is squeezed, the pawl 72 slides along the guideway G and, by virtue of its frictional engagement with the paper, pulls the expended portion of the strip P rearwardly a step. This brings an unbroken area of the paper P in front of the gun muzzle during the interval while the piston 20 is being retracted and before the clamping of the paper by the ring 50 takes place.

When the pin 46 is cammed out of the recess 48 to release the piston rod 22, the pin 46 thereafter bears against the lower edge of the rod 22, whereby the feed pawl 72 is maintained spaced from the flange 76. Then, as the trigger 36 is restored the pin 46 rides along the lower edge of the rod 22, keeping the pawl 72 away from the paper P until the trigger is fully restored. Thereupon the pin 46 moves into the recess 48, and the pawl 72 is brought back into engagement with the paper P in the guideway G.

The paper roll R fits loosely in the cylindrical magazine 24, being retained therein by a small resilient plate 82 which is clipped onto the magazine 24. The plate 82 may be swung downwardly when a new roll is to be inserted in the magazine 24, being then restored to the position shown to prevent the roll R from dropping out of the magazine.

It will be apparent from the foregoing description that I have provided a toy gun which incorporates the advantages and features herein-above referred to. While a preferred embodiment has been disclosed, this is capable of modification within the purview of the invention and it is intended therefore to include all such modifications within the scope of the appended claims.

I claim:

1. A toy paper-burster gun of the automatic paper feed and burster type including in combination, feedable paper carried in said gun, means for bursting said paper including a piston rod slidably supported in said gun, mechanism for feeding said paper including feed means selectively engageable with said paper and also including piston-rod-engaging-means, with said feed means and said piston-rod-engaging-means being interconnected by a portion of said mechanism for movement as a unit, means for mounting said mechanism in said gun so that said piston-rod-engaging-means releasably connects with and moves said piston rod and so that said feed means engages with and moves said paper on a working stroke of said mechanism, and means acting at the end of said working stroke for disengaging said piston-rod-engaging-means and said piston rod, with said piston-rod-engaging-means thereafter slidably engaging said piston rod and moving relative thereto to move said feed means out of contact with said paper during a return stroke of said mechanism.

2. A toy paper-burster gun of the type which alternately feeds and bursts a paper strip carried therein, such gun comprising stationary means forming a guideway for the paper strip, paper bursting means including a piston rod slidably mounted in the gun, mechanism movably mounted in the gun including paper feed means movable into and out of said guideway and also movable along said guideway, said mechanism also including a portion engaging said piston rod, with said feed means and said engaging portion being interconnected by a portion of said mechanism for movement as a unit, said piston rod having a part complementary with said engaging portion to afford a releasable connection therebetween and also to dispose said paper feed means in said guideway, means for actuating said mechanism to cock said piston rod and to feed the paper strip during a working stroke of said mechanism, and means for disengaging said piston rod part and said engaging portion at the conclusion of the working stroke, with said engaging portion thereafter slidably engaging said piston rod and moving relative thereto to dispose said paper feed means out of said guideway during a return stroke of said mechanism.

3. In a paper-burster gun with feedable paper therein, the combination including a gun housing, a piston rod supported in said housing for substantially straight line movement on both a working stroke and a return stroke, paper feed means movably mounted in the housing adapted to engage paper during a working stroke and adapted to be disengaged therefrom during a return stroke, means operatively connecting said paper feed means with said piston rod whereby they move together for the duration of a working stroke, means disconnecting said paper feed means from said piston rod at the completion of the working stroke so that they may move relative to one another, means moving said paper feed means and said operatively connecting means relative to said piston rod at said completion of a working stroke, said operatively connecting means engaging said piston rod on said latter movement and being guided thereby and moving said paper feed means out of engagement with the paper during said latter movement returning said feed means to idle position.

4. In a paper-burster gun having feedable paper therein, the combination of a housing for said gun having therein a paper guideway including wall means with a longitudinally extending inside wall surface over which feedable paper can be moved, paper bursting means including a member supported in said housing for movement relative to said wall surface, mechanism having operatively connected portions movably mounted in said housing and adapted at one of its portions to releasably connect with said member to cock the same and adapted at another portion to simultaneously act with said cocking upon paper to feed the same in said guideway and against said surface, means for removing said first portion of said mechanism from said releasable connection with said member to permit the latter to drive to an idle position and with said paper feed portion in said mechanism being thereby removed from the paper, and means for returning said paper feed portion to idle position, with said paper feed portion being maintained out of engagement with the paper by operative sliding engagement with said member during said return movement to idle position.

5. Mechanism movably mounted in the housing of a paper-burster toy for repeatedly feeding and bursting paper upon continuous operation of the toy, said mechanism comprising in combination, piston means including a piston rod slidably supported in said housing, paper feed means engageable with the paper on a cocking movement of the mechanism and disengageable from the paper on a return movement of the mechanism to idle position, mechanism actuating means operatively connected with said paper feed means, engaging means operatively connected with said paper feed means, and with said mechanism actuating means for engaging said piston rod, said piston rod having a guiding edge with a recessed portion therein for cooperation with said engaging means and having an air pressure developing function in the bursting of the paper, means for mounting the mechanism in the housing in a position such that said engaging means is releasably connected with the guiding edge of said piston rod at said recessed portion thereof during the cocking movement of the mechanism, means in said mechanism and on the housing acting to withdraw said engaging means from said recessed portion and thereby break said releasable connection at the completion of the cocking movement, and means maintaining said engaging means on said guiding edge of said piston rod during a return movement and thereby maintaining said paper feed means away from the paper.

6. In a paper-burster gun with paper therein, a housing, a cockable piston rod having a shoulder portion therein, means supporting said piston rod for substantially straight-line movement in said housing, mechanism movably mounted in the gun having operatively connected portions which include a paper feeding portion, a portion for engaging said piston rod, and a trigger portion, means supporting said mechanism in the housing in a position such that said engaging portion is maintained in engagement with the shoulder portion of said piston rod for a cocking movement of said trigger portion to move said piston rod to a cocked position, with said feeding portion simultaneously engaging and feeding the paper during such cocking movement, means releasing said engaging portion from said piston rod shoulder portion at the end of the cocking movement to permit substantially straight-line movement of the piston rod for developing air pressure to burst the paper, means for moving said mechanism to an idle position, and guide means having a cooperative relationship with said engaging portion during the movement of said mechanism to an idle position to maintain said engaging portion in a substantially straight line of movement and at the same time maintain said feeding portion out of engagement with the paper during such movement to an idle position.

7. In a paper-burster gun of the type for repeatedly feeding and bursting paper upon continuous operation of the gun and having feedable paper therein, the combination including a gun housing, paper bursting means including a member supported in said housing for movement relative thereto, mechanism having operatively connected portions movably mounted in said housing and adapted at one of its portions to releasably connect with said member to move the same and adapted at another portion to simultaneously act with said moving operation upon paper to feed the same in the gun, cam means acting to remove said first mentioned portion from said releasable connection with said member to permit the latter to drive to an idle position and with said other portion being concurrently removed from feeding connection with the paper, means for returning said mechanism to idle position, and guide means maintaining said other portion out of engagement with the paper during said return movement of the mechanism.

8. In a paper-burster gun having paper feedable therethrough, the combination of a gun housing having an inside longitudinally extending paper-guiding surface therein, a piston unit having a piston rod supported for movement in said housing in a line substantially parallel with said paper-guiding surface, said piston rod being recessed to define a shoulder portion on one side thereof away from said paper-guiding surface, means movably mounted in said housing for moving said piston rod to cock said piston unit, including a trigger and linkage operatively connected to said trigger, and said linkage including a portion thereon releasably engaging said shoulder portion and moving said piston rod therewith upon a cocking movement of said trigger, a feed pawl on said linkage adapted to bear against the paper to press the same against said guiding surface and to feed the paper upon said cocking movement, with said feed pawl being in said paper feeding position during said cocking movement when said linkage portion is engaged, and with said linkage portion being releasable from said shoulder portion at the conclusion of said cocking movement to uncock said piston rod and permit movement thereof relative to said linkage in said line substantially parallel to said paper-guiding surface means for returning said trigger to an idle position, and guide means having a cooperative relationship with said linkage portion during the movement of said trigger to its idle position to maintain said feed pawl out of engagement with the paper.

*9. In a paper burster toy having feedable paper and means adapted to be cocked and released to move and develop air pressure for bursting paper, the combination of paper feed means, actuating means releasably connectible with the air pressure developing means to cock the same in the cocking movement thereof and thereafter being disconnectible therefrom to permit the bursting movement of the air pressure developing means, means operatively connecting said paper feed means and said actuating means so that they move concurrently, with said paper feed means engaging and feeding the paper on the cocking movement, guide means in said toy with a surface spaced from the feedable paper and extending in a direction corresponding substantially to the direction of the path of movement of the portion of the paper from which it is spaced, said guide surface being engageable by a portion of the actuating means on the return movement only of the latter to maintain said paper feed means out of contact with said paper, and means for returning said actuating means and said paper feed means to an idle position in said toy.*

*10. In a paper burster toy having feedable paper and means adapted to be cocked and released to move and develop air pressure for bursting paper, the combination of paper feed means, actuating means releasably connectible with the air pressure developing means to cock the same in the cocking movement thereof and thereafter being disconnectible therefrom to permit the bursting movement of the air pressure developing means, means operatively connecting said paper feed means and said actuating means so that they move concurrently, means positioning said paper feed means so as to engage and feed the paper on the cocking movement, guide means in said toy with a surface spaced from the feedable paper and extending in a direction corresponding substantially to the direction of the path of movement of the portion of the paper from which it is spaced, said guide surface being engageable by a portion of the actuating means on the return movement of the latter and said guide surface being spaced a distance so as to maintain said paper feed means out of contact with said paper on said return movement, and means for returning said actuating means and said paper feed means to an idle position in said toy.*

*11. In a paper burster toy having feedable paper and means adapted to be cocked and released to move and develop air pressure for bursting paper, the combination of paper feed means, first means having a portion releasably connected to said air pressure developing means to cock the same in the cocking movement thereof and thereafter being disconnectible therefrom to permit the bursting movement of the air pressure developing means, means operatively connecting said paper feed means and said first means so that they move concurrently, said first means portion when in said releasable connection being positioned to determine the engagement of said paper feed means with said paper to feed the paper on the cocking movement, guide means in said toy with a surface spaced from the feedable paper and extending in a direction corresponding substantially to the direction of the path of movement of the portion of the paper from which it is spaced, said first means having an engagement with said guide surface on the return movement of the first means, and said guide surface being provided in said toy in a position relative to said paper to maintain said paper feed means out of contact* with said paper on said return movement, and means for returning said first means and said paper feed means to an idle position in said toy.

12. In a paper burster toy having a housing, feedable paper, and means developing air pressure for bursting paper, the combination of a paper feed unit, cocking means operatively connected to the air pressure developing means to cock the same in the cocking movement thereof, actuating means for the toy movable in a cocking movement and in a return movement operatively connected with said paper feed unit and having a portion to effect a releasable connection with the cocking means, said connection portion being at a position within the housing when the releasable connection is made and moving along a path during said cocking movement such that said position and path are spaced from the paper a distance to permit said paper feed unit to engage and feed the paper, and said connection portion being releasable upon accomplishing the cocking movement, and means having a guide surface in the housing, with said actuating means having an engagement with said surface during a return movement of the actuating means and said guide surface extending in a path spaced from said first mentioned path and spaced relative to the paper so that said feed unit is maintained out of engagement with the paper during said entire return movement whereby said actuating means connection with said cocking means on said cocking movement and said actuating means engagement with said guide surface on said return movement affect, respectively, the feed unit engagement and disengagement with the feedable paper.

13. In a paper burster toy having feedable paper and means adapted to be cocked and released to move and develop air pressure for bursting paper, the combination of paper feed means which moves in one path to feed the paper, and upon a return movement thereof moves in a second path spaced from the first path for spacing said paper feed means out of engagement with the paper, toy actuating means adapted to releasably connect with the air pressure developing means for operation to cock the same in the cocking movement thereof and to disconnect therefrom for the bursting movement of the air pressure developing means, means operatively connecting said paper feed means and said toy actuating means so that they move concurrently, with said paper feed means moving in a path and engaging and feeding the paper on the cocking movement, guide means in said toy having a surface spaced from the feedable paper a distance and extending in a direction to maintain said paper feed means in the aforesaid second path of movement, and a portion in said toy actuating means engaging said guide means surface and moving therealong during the return movement of said paper feed means.

14. In a paper burster toy having a housing, feedable paper, and means developing air pressure for bursting paper, the combination of a paper feed unit in the housing, a piston rod movably mounted in the housing connected to the air pressure developing means to cock the same in the cocking movement thereof and having an engageable portion, actuating means for the toy operatively connected with said paper feed unit and having a portion to effect a releasable connection with the engageable portion of said piston rod in the housing to move the piston rod in a cocking movement, said connection portion being at a position when the releasable connection is made and moving along a path during said cocking movement such that said position and path are spaced from the paper a distance to permit said paper feed unit to engage and feed the paper and paper engagement is governed by said releasable connection position, with said connection portion being releasable from the piston rod upon accomplishing the cocking movement thereof, said piston rod having a guide surface thereon for guide connection with said actuating means during a return movement of the latter, and said guide surface extending in a path spaced from said first mentioned path and spaced further from said paper than said first mentioned path to maintain said feed unit out of engagement with the paper during said return movement.

15. In a paper burster toy having a housing, feedable paper, and means for developing air pressure to burst the paper, the combination including piston rod means mounted in the housing and operatively connected with the air pressure developing means, actuating means releasably connectible with said piston rod means to move the latter and cock the same in a cocking movement thereof and releasable from said piston rod means after completion of the cocking movement for return to an idle position, a paper feed unit operatively connected with said actuating means and movable upon movement of said actuating means, said paper feed unit adapted to be moved in one direction in contact with the paper to feed the same and adapted to be moved in the opposite direction in a guided path out of contact with the paper to avoid disturbing or injuring the same, said piston rod means having a guide portion, said actuating means having a portion engageable with said guide portion on the return movement of said paper feed unit and said paper feed unit moving responsively to the return movement of the actuating means, and with said guide portion being effective when engaged by said portion to maintain the paper feed unit out of contact with the paper.

16. In a paper burster toy of the type for repeatedly feeding and bursting paper in an automatic fashion having mechanism including air pressure developing means, all operating with a cocking movement to an air pressure developing position for bursting the paper and then with a return movement to an idle position, which toy has a housing and has feedable paper, the combination of actuating means movably mounted in said housing, a movable paper feed unit acting concurrently with a cocking movement of said mechanism to feed the paper and being guided during an entire return movement thereof so as to remain out of engagement with the paper to avoid disturbing or injuring the same, said actuating means being operatively connected to said feed unit to move said feed unit upon the cocking movement of said mechanism and having a portion releasably and operatively connected to said air pressure developing means to cock the same upon said cocking movement, said actuating means also having a trigger operatively connected to said portion, which such trigger is gripped and moved to alone initiate the complete operation of the toy in the automatic fashion, said portion being releasable from said connection with said air pressure developing means upon the accomplishment of the cocking movement, guide means within said housing, with said paper

*feed unit upon the return movement thereof being operatively associated with said guide means and maintained out of engagement with the paper, and spring means operatively connected with said feed unit to effect said return movement thereof.*

*17. In a toy gun for bursting paper which is feedable therein and having means therein for bursting the paper, the combination of a paper-feed member operating in a path of movement in engagement with the paper to be fed and operating in a different path out of engagement with the feedable paper on a return movement in the gun operation, hand-operated mechanism on the gun operatively connected with said paper-feed member for moving the latter and to in turn feed paper in the gun, guide means in the gun having a guide surface, and guide-surface-engaging means in the gun operatively connected with the paper-feed member and engaging said guide surface only on the return movement of said paper-feed member, and with said guide surface being spaced a distance from the paper and guidably controlling the paper-feed member through said guide-surface-engaging means so as to maintain such member in said different path and out of engagement with the paper during said return movement.*

OTTO A. LANGOS.

REFERENCES CITED

The following references are of record in the file of this patent or the original patent:

UNITED STATES PATENTS

| Number | Name | Date |
|---|---|---|
| 624,543 | Rightmyer | May 9, 1899 |
| 986,322 | Stone | Mar. 7, 1911 |
| 1,112,563 | Sackman | Oct. 6, 1914 |
| 1,203,274 | Sandage | Oct. 31, 1916 |
| 1,240,990 | Lefever | Sept. 25, 1917 |
| 1,376,867 | Fuller | May 3, 1921 |
| 1,438,017 | Brown | Dec. 5, 1922 |
| 1,480,344 | Bowman | Jan. 8, 1924 |
| 1,511,718 | Burger | Oct. 14, 1924 |
| 1,881,455 | Frisbie | Oct. 11, 1932 |
| 2,083,535 | Langos | June 8, 1937 |
| 2,145,277 | Reardon | Jan. 31, 1939 |
| 2,168,454 | Smith | Aug. 8, 1939 |
| 2,176,474 | Smith | Oct. 17, 1939 |
| 2,226,144 | Smith | Dec. 24, 1940 |
| 2,237,678 | Lohr et al. | Apr. 8, 1941 |
| 2,355,595 | Langos | Aug. 8, 1944 |
| 2,440,177 | Laidig | Apr. 20, 1948 |